Oct. 11, 1927. 1,645,118
H. A. SEABRIGHT
SIZE GAUGING MACHINE
Filed Feb. 2, 1925  3 Sheets-Sheet 1

Inventor
Huber A. Seabright.
By W. D. McDowell.
Attorney

Oct. 11, 1927.  H. A. SEABRIGHT  1,645,118
SIZE GAUGING MACHINE
Filed Feb. 2, 1925    3 Sheets-Sheet 2

Inventor
Huber A. Seabright
By W. D. McDowell
Attorney

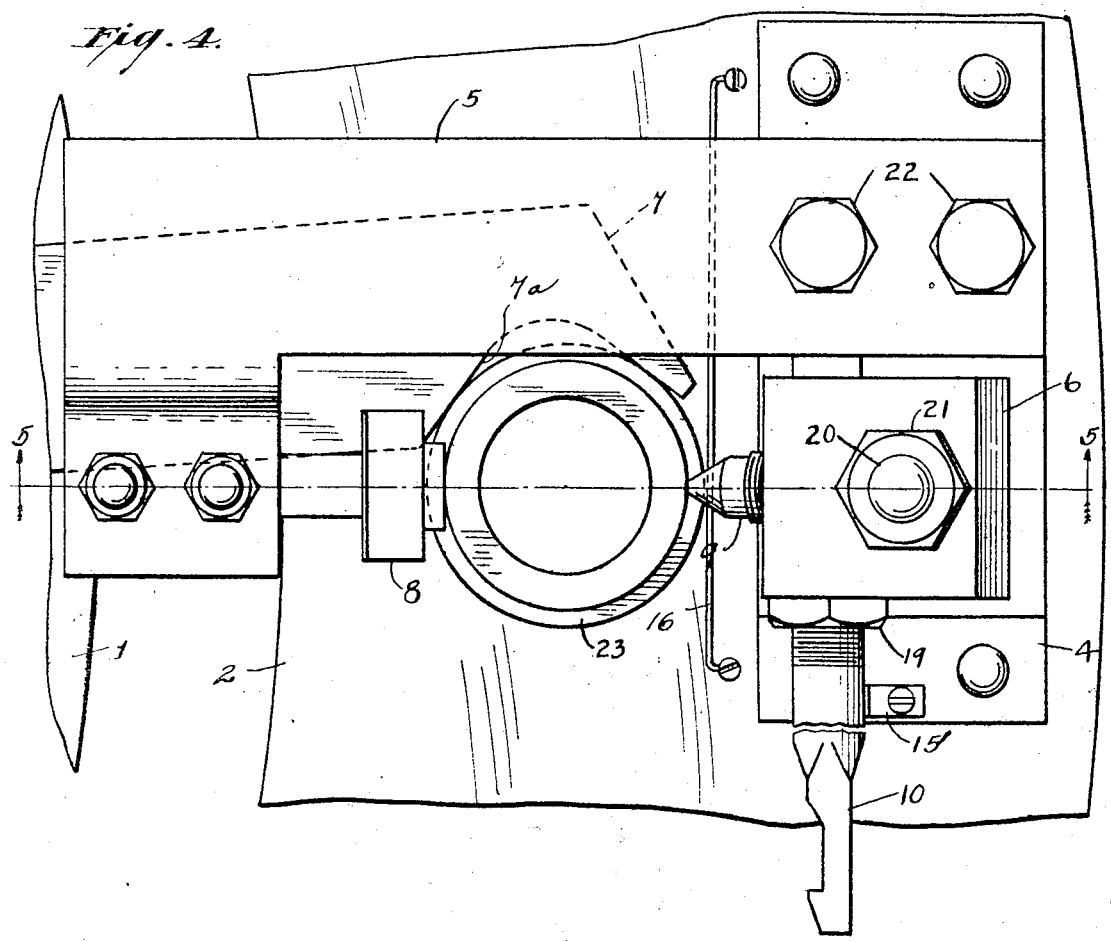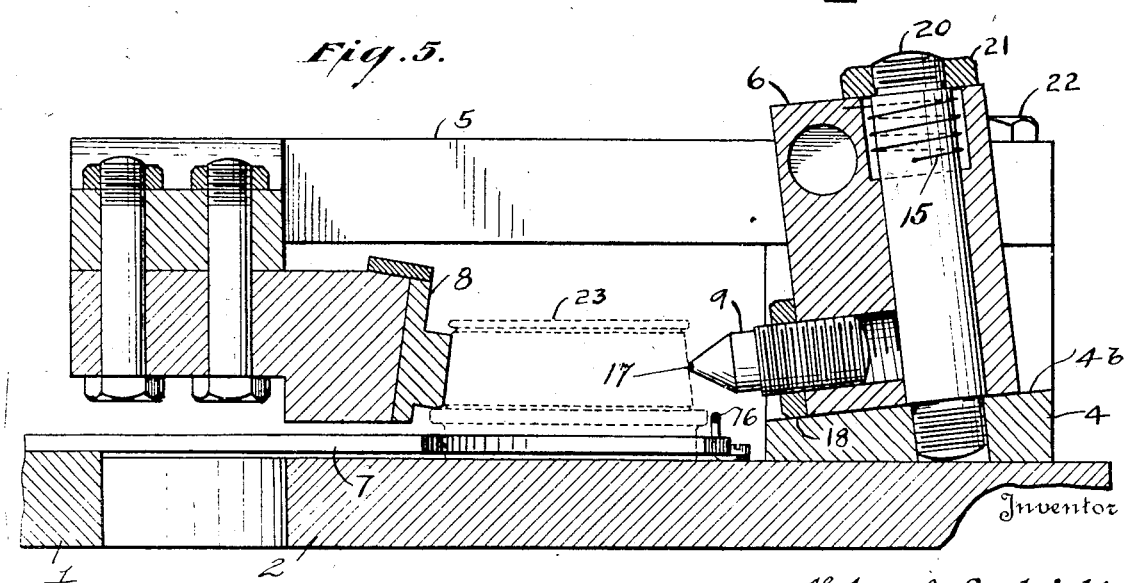

Patented Oct. 11, 1927.

1,645,118

UNITED STATES PATENT OFFICE.

HUBER A. SEABRIGHT, OF COLUMBUS, OHIO.

SIZE-GAUGING MACHINE.

Application filed February 2, 1925. Serial No. 6,351.

This invention relates broadly to sizing, gauging and assorting apparatus, and has particular reference to an improved automatic size gauging machine adapted for use in manufacturing establishments for the purpose of maintaining manufacturing standards, insuring accurate, rapid and economical inspection with but a minimum of manual supervision.

Another object of the invention resides in the provision of a size determining or gauging machine in which the bodies or pieces to be gauged are caused to move successively between actuating guaging fixtures having adjusted points of contact, the arrangement of the fixtures being such that when the bodies or pieces are oversize, the same engage the fixtures so as to operate discharge mechanism which moves or releases the body being tested from the table of the machine, so that the different sized bodies or pieces may be assured or segregated and handled as desired; a further object of the invention is to provide an accurate, efficient and automatic means of gauging round, square, cylindrical, tapered, spherical and other shaped pieces or bodies and, second, to utilize positive direct, linearly actuated mechanism to automatically select, discharge and deposit the gauged pieces or bodies according to determinable sizes and limits of the pieces or parts being gauged.

With these and other objects in view, as will appear as the description proceeds, the invention consists in the novel features of construction, combinations of elements and arrangements of parts hereinafter to be fully described and pointed out in the appended claims.

Figure 1:
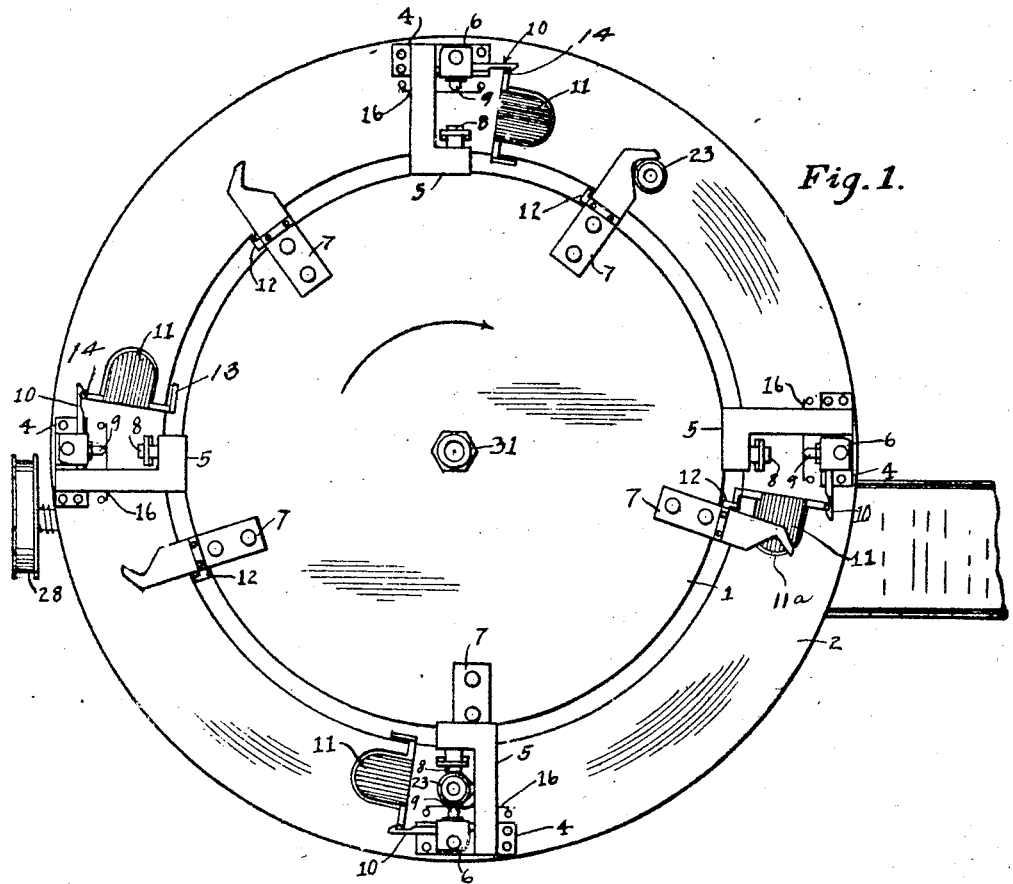
Figure 2:
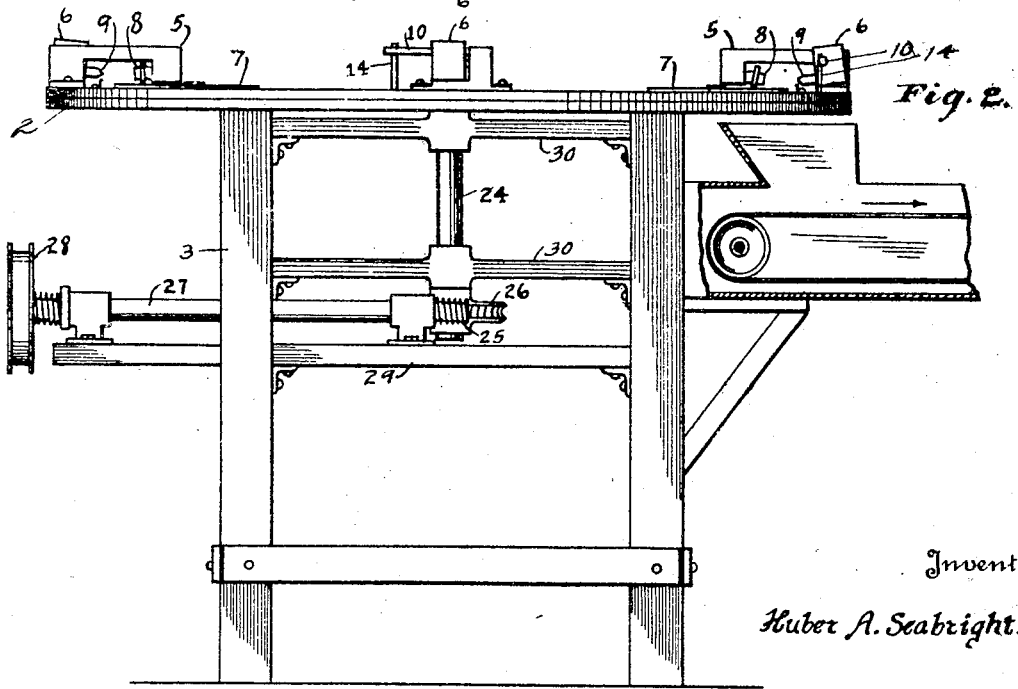
Figure 3:
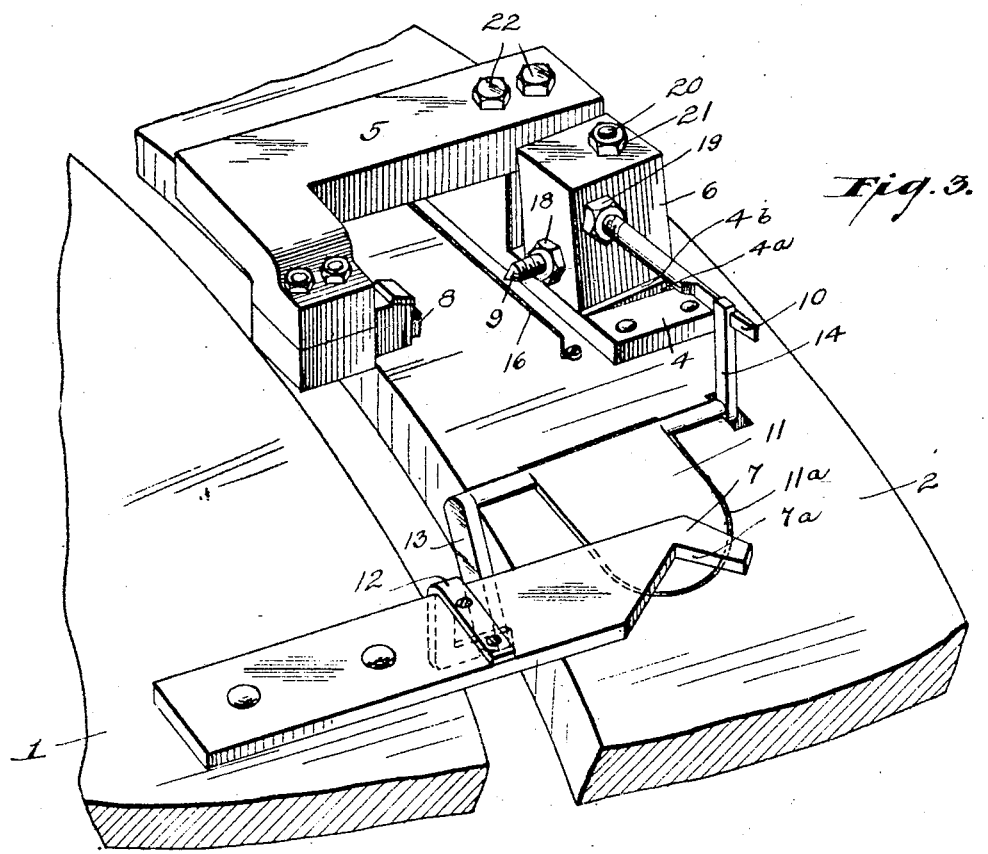
Figure 6:
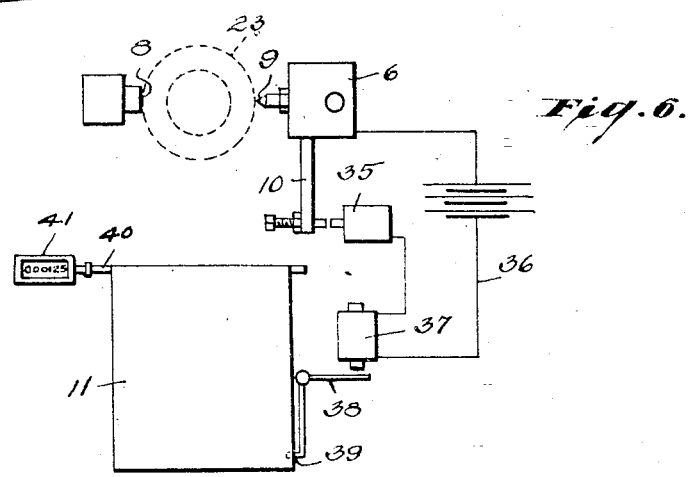

In the accompanying drawing:

Figure 1 is a plan view of the size gauging machine comprising the present invention, Figure 2 is a side elevation thereof, Figure 3 is a perspective view of one of the gauging fixtures, Figure 4 is a plan view of the gauging fixture, Figure 5 is a vertical sectional view taken on the line 5—5 of Figure 4, and Figure 6 is a detail view of a slightly modified form of apparatus.

Referring to the drawings there is embodied a size gauging machine which is particularly adapted for use in the metal trades for the purpose of testing and gauging automatically the relative sizes of a plurality of similar parts, in this instance a machine is employed for testing the sizes of the inner race-ways of a roller bearing, however, it will be understood that the invention is adapted for use in connection with the measurement of pieces or bodies of varying form and contour and employed for any purpose.

In the present instance the machine is formed to include a circular rotating table 1, which is surrounded by a stationary table 2, legs 3 being utilized to effect the support of the machine and the tables 1 and 2 at a suitable horizontal level above the floor line. It will be understood that the stationary table is provided with an inner circular opening in which the inner circular table 1 is positioned for axial rotation.

On the stationary table 2 are mounted one or more appropriately spaced pedestal blocks 4, to which are attached rigid inwardly and regulating extending arms 5, which are disposed in a horizontal plane above the table 1 and extend inwardly to positions in substantial registration with the rim of the table 1. The pedestal blocks are provided with lateral extensions $4^a$, which include inclined faces $4^b$, upon which are mounted rotatable fulcrum blocks 6, which blocks are disposed perpendicularly to the surfaces $4^b$, and are adapted to rotate around perpendicular axes to be hereinafter more particularly set forth.

Mounted on the rotating table 1 are one or more notched fingers 7. These fingers comprise metallic bars, which are secured in a substantially axial manner to the upper surface of the table 1. The outer ends of the fingers 7 are provided with substantially V shaped notches $7^a$ which operate in a horizontal plane over the stationary table 2 and are of such construction as to embrace the material to be gauged so as to force said material to travel in unison with the table 1 while deposited upon the upper surface of the stationary table 2. The shape of the notch $7^a$ is of course governed by the shape of the material to be gauged in the machine.

The arms 5 of the blocks 4 are provided with contact points 8, while the movable fulcrum blocks 6 are provided with adjustable contacts 9, normally disposed in spaced relation from the contacts 8 and spaced apart the required distance necessary to permit the work being tested to pass therebetween.

In the event that the work or the pieces being tested is oversize, the same will strike the contact points 8 and 9, causing the fulcrum block engaged to be rotated around its substantially vertical axis and to swing in unison therewith a hook 10 which, in this instance, extends rigidly from the block 6 at right angles substantially to the contact 9. The table 2 is fitted with swinging trap doors 11 which normally close correspondingly formed openings 11ª provided in the table 2. When the doors 11 are open the gauge pieces are discharged into receptacles, bins or conveyors located in a plane below the table 2. Attached to or formed with the fingers 7 are depending lugs 12 which are adapted to engage crank arms 13, provided upon the doors 11, when the latter assume their open position. The engagement of the lugs 12 with the arms 13 results in swinging the doors 11 upwardly and retaining the same in their closed positions by the engagement of the crank arms 14 with the hook shaped ends of the members 10. Springs 15 and 15' are used to return the fulcrum block 6 to a normal position, wherein the contacts 9 are in registration with the contacts 8 and the hook shaped extremities of the members 10 in position for cooperation with the crank arms 14.

On the stationary table 2 are mounted guides 16, which cause the parts, which are being gauged, to make contact with the stationary points 8 while passing contact points 9, thus preventing erratic operation on the part of the movable contact points 9 and associated parts including the hooks 10 and the trap doors 11.

The movable contact points 9 have smooth faced jewels 17 in the ends of the points so as to eliminate, for all practical purposes, wear and inaccuracy, moreover, the contact points 9 are provided with lock nuts 18, to prevent loosening after adjustment is made by a threading of the points 9 in or out of the fulcrum box 6. The hooks 10 are likewise adjustable and are provided with lock nuts 19 which retain the same in proper positions for engagement and cooperation with the arms 14. The fulcrum blocks 6 are rotatably received on spindle bolts 20 and are held in operative position by means of nuts 21, the spindles extending perpendicularly from the foot extension 4ᵇ. The arms 5 may be integrally formed with the blocks 4 or attached thereto by means of cap screws 22. As the table 1 rotates in a clock-wise direction, as indicated by the curved arrow in Figure 1, the fingers 7 are caused to travel in a circular path over the stationary table 2, the pieces or bodies 23 to be gauged are placed, either mechanically or manually, in the path of the notches 7ª and moved successively between the gauging points or contacts 8 and 9. The distances between the points 8 and 9 are regulated and graduated according to the sizes and limits of the pieces being gauged, the same being largest at the beginning and smallest at the end of the travel. Thus the pieces 23 in coming into contact with the points 8 and 9, will cause the point 9 to move in an arc about the center of the spindle bolt 20. The fulcrum block 6 likewise transmits a similar motion to the hook 10, thereby releasing its associated arm 14 so that the door 11 will drop to an open position, permitting, under the continued advance of the piece 23, of the dropping or depositing of said piece into the opening 11ª and thence to a suitable point of discharge. Following this discharge, the lug 12 engages with the crank arm 13 so as to close the trap door and moreover to move the arm 14 into position to be engaged and retained by the hook 10.

I prefer the motion outlined above especially for the reason that the moving piece being gauged imparts a somewhat similar motion to the contact point 9. This movement is positive and free from undue friction or jar, and normally gives approximately fifty times the diametrical excess of the piece being gauged over the distance between the contact points 8 and 9. Thus a piece having a diameter one thousandth of an inch larger than the distance between contacts 8 and 9 causes a movement of contact point 9 of fifty thousandths of an inch. By making the hook 10 with twice the radial length of that of the contact point 9, there is secured a hook movement of one-tenth of an inch. Should further movement be desired, the same can easily be obtained by making the surface of the contact point 8 slightly concaved.

The table 1 is driven by a vertical shaft 24, the worm 25, the worm gear 26, the horizontal shaft 27 and friction drive pulley 28. The shaft 27 is supported on the member 29 and the shaft 24 is supported by bearings 30 and a securing nut 31.

In the modified form of the invention disclosed in Figure 6 a structure is set forth wherein the trap door 11 is released by electric means rather than the purely mechanical form of trip disclosed in the preferred form of the invention. In Figure 6 the hook 10 when oscillated operates a switch structure 35, which closes the circuit 36 including a solenoid 37. When the winding of the solenoid is excited, a pivoted armature 38, which includes a hook 39 is operated to effect the release of the door 11. Also, if desired the shaft 40 about which the door 11 pivots, may be connected with a counting mechanism 41 by means of which the number of pieces tested may be readily ascertained at the end of a day's operation.

What is claimed is:

1. In a sizing machine, a circular work supporting way, revolving means for moving bodies to be sized through said way, fixed and movable sizing fixtures mounted adjacent to said way and arranged to engage said bodies, said movable fixture comprising a member rotatable about an upright axis, a latch arm extending rigidly from said movable fixture, and a discharge means provided in said way and normally maintained in a closed position by said arm, said discharge means being actuated to assume an open position upon the rotation of said movable fixture and said arm.

2. In a sizing machine, a circular way, means for advancing bodies to be sized through said way, fixed and movable fixtures arranged adjacent to said way, said movable fixture being formed to comprise a body turnable about an axis disposed substantially perpendicular to the plane of said way, yielding means for maintaining said movable fixture in a normal position, and an adjustable contact device carried by said movable fixture and projecting into said way.

3. In a sizing machine, a circular way, revolving means for advancing bodies to be sized through said way, a fixed sizing fixture disposed adjacent to said way, a movable sizing fixture mounted adjacent said way and in registration with said fixture, said movable fixture being formed to include a body turnable about a substantially vertical axis, an adjustable contact element carried by said body and projecting into said way, said element being adjustable in a direction perpendicular to the axis of turning movement of said movable fixture, and a longitudinal guide stationarily carried by said way and disposed immediately adjacent to said movable fixture.

In testimony whereof I affix my signature.

HUBER A. SEABRIGHT.